May 19, 1964 D. L. BALLARD 3,133,786

FLYING SPOT DATA INPUT OR READOUT FOR SUPERIMPOSABLE CARD INFORMATION RETRIEVAL SYSTEM

Filed April 19, 1961 2 Sheets-Sheet 1

United States Patent Office 3,133,786
Patented May 19, 1964

3,133,786

FLYING SPOT DATA INPUT OR READOUT FOR SUPERIMPOSABLE CARD INFORMATION RETRIEVAL SYSTEM

Delbert L. Ballard, Bethesda, Md., assignor to Jonker Business Machines, Inc., a corporation of Delaware
Filed Apr. 19, 1961, Ser. No. 104,122
6 Claims. (Cl. 346—110)

This invention pertains to information retrieval systems based on the use of superimposable cards dedicated to terms and the determination of coincidence of holes in said cards. These systems are also known as Peekaboo systems. Commercially they are known as Termatrex systems.

In Termatrex systems, an item of information is prepared for entry into the system by first indexing it by a number of terms taken from a vocabulary of terms. Each item of information is given an accession number.

Termatrex systems comprise a number of cards each dedicated to a term. In total there will generally be a vocabulary of between 500 and 5000 terms. On each termcard there is generally one place dedicated to a document in the collection. Each document has the same position dedicated to it on each termcard.

Items of information are entered into a Termatrex system by selecting all of the termcards by which that item has been indexed, placing these cards in superimposition in a Termatrex machine, and drilling a hole in all of these cards simultaneously at the position dedicated to that item of information.

The system is searched by selecting a number of termcards together describing a search question, and placing these in superimposition in a Termatrex machine. Next, a light in the bottom of the Termatrex machine is turned on. The coinciding holes in these termcards are then visible as light dots. The serial number of these light dots can then be read off one by one, for example, by means of a transparent grid with an $x$—$y$ coordinate system on it.

Present Termatrex systems are essentially hand operated as far as positioning of the drill and the lowering and raising of the drill is concerned.

However, there are very many operations which require a semi or fully automatic data input. One is the case where a large amount of data has to be entered in a very short time.

Instead of entering data by drilling holes in cards, it is also possible to create images of such cards upon photographic film. Transparent spots then represent holes, while the rest of the cards will be opaque.

This can be accomplished by photographing an array of lights. If the termcards have, for example, 10,000 positions dedicated to items of information, the array should have 10,000 lights. To produce the equivalent of a card with certain holes, the lights corresponding to said holes are turned on and a picture is taken. However, the cost of this is tremendous, the bulk considerable and the speed of operation low.

However, according to the invention, the photographic film is exposed by means of a cathode ray tube. This makes it possible to enter data at very high speed from magnetic tape, paper tape, punched cards or "on line" on some computers.

In converting digital information into geometric arrangements of information-bearing discreet locations within the emulsion plane of photographic film it is necessary to establish accurately known positions for the appearance of spots of light to be focused upon the film as required. The use of a "flying spot" cathode ray tube permits positioning and modulation of the light spot in accordance with the desired pattern.

However, in applications requiring a large number of discreet positions, say one hundred locations in each of two mutually perpendicular axes, the minute increments of voltage on the deflection plates of the cathode ray tube become quite difficult to control within the desired degree of accuracy.

One method for positioning the flying spot has been described by L. E. Gallaher in the Bell System Technical Journal, volume XXXVII, Number 2, pages 425–444 in an article entitled "Beam-Positioning Servo System for the Flying Spot Store."

The method herein disclosed is intended to simplify the beam controlling circuitry and to provide a very high degree of accuracy in registration of the information bearing spots upon the film.

To describe the methods and apparatus employed in the present invention reference will be made to the following figures.

Figure 1:
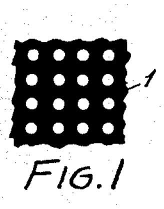
FIGURE 1 shows an enlarged view of a portion of the spot defining grid pattern.
Figure 2:
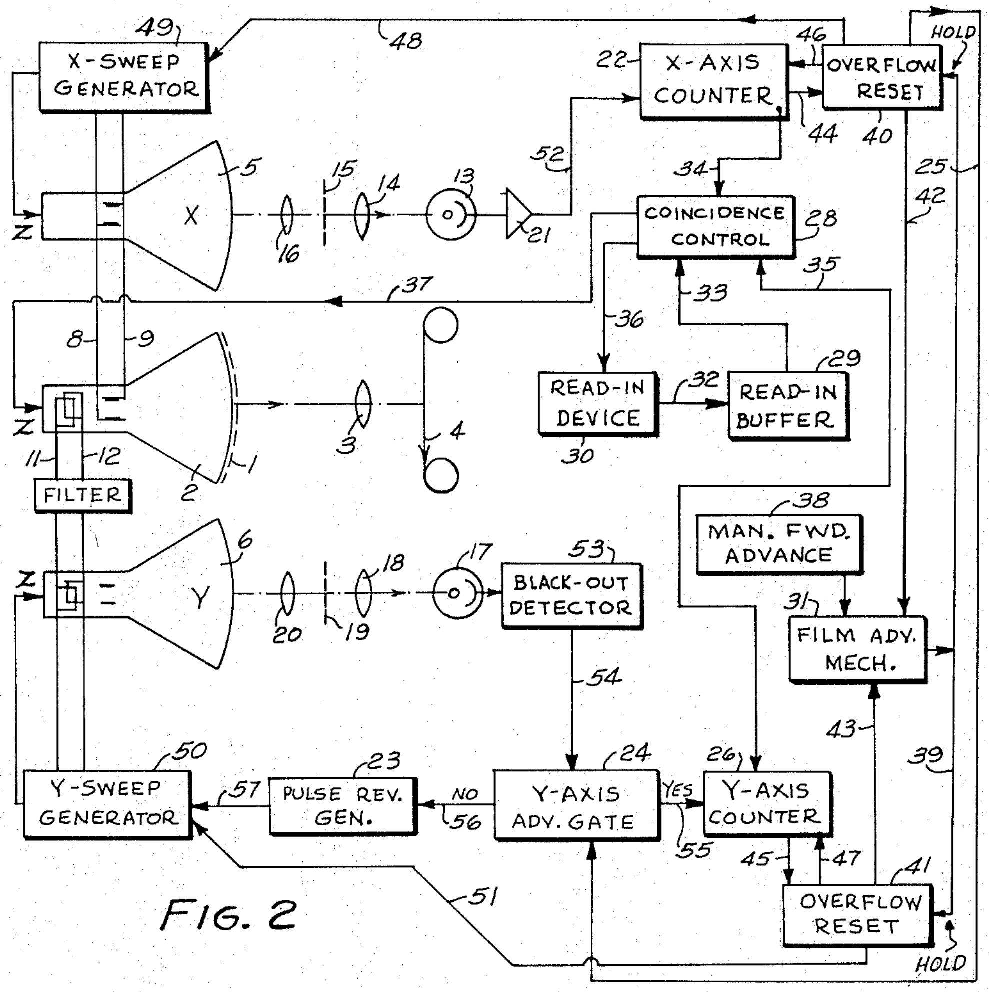
FIGURE 2 shows a block diagram of various components and functions which in combination comprise the present invention.

As a means of maintaining definite spot boundaries, a grid pattern, shown in FIGURE 1, of the desired shape and size of transparent spots located within an otherwise opaque field is interposed as in FIGURE 2 at 1 between the face of the cathode ray tube 2 and the lens system 3, at a point close to the face of said tube and in such relationship to the lens systems and the film 4 as to form a sharply focused image of the grid pattern upon said film. The "flying spot" beam is then adjusted to a size of spot slightly larger than any individual transparent spot in the grid but not large enough to overlap upon any adjacent spot position.

To provide means for exposing the film in any desired spot location, one "flying spot" cathode ray tube 2 hereinafter referred to as the "raster tube" will be provided with the previously mentioned spot grid pattern and lens system, and the beam of this raster tube will be turned on to produce a light spot only where and when required.

Two additional cathode ray tubes, 5 and 6, identical in type with the raster tube, will be provided with ladder-like optical commutator patterns 15 and 19 as shown in FIGURE 2. Enlarged detail is shown in FIGURE 3.

Figure 3:
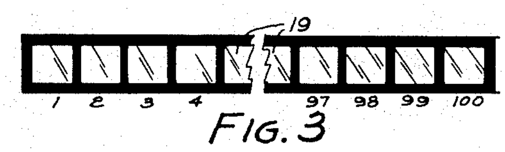
FIGURE 3 shows an enlarged view of a portion of the optical commutator pattern.

The pattern shown in FIGURE 3 will be used to provide information as to the location of the beam in one axis, say the X-axis. The corresponding deflection plates in this controlling tube and the raster tube will be tied electrically in parallel by wires 8 and 9 to provide similar deflections. A continuous beam, when the controlling tube is sweeping in a forward direction, will cause a chopping or commutation of the light rays reaching the photocell 13 at the focal point of the associated lens system 14 and 16. Each pulse of light detected by the photocell 13, will, through the amplifier 21 and associated circuitry, cause the X-axis coordinate step counter 22 to advance by one binary step. Upon reaching the last step for this grid line (in the example stated, the one hundredth step) the beam will be blanked out and returned to the zero position, after which time the sweep cycle will again start. Upon return of the X-axis sweep, the Y-axis coordinate counter 26 will advance one binary step and the Y beam will be advanced one position.

Figure 4:
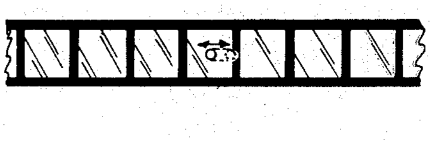
FIGURE 4 shows the manner in which the spot is made to jitter when it is not desired to advance the Y axis.

The Y-axis beam will be held in a relatively constant position during sweep of the X-axis as now described. The pattern shown in FIGURE 3 is associated with the Y-axis controlling tube 6 and lens system 18 and 20. The spot size of the Y-axis controlling tube is adjusted to such size that the ladder pattern 19 will cause extinction of the beam reaching the photocell 17 as it attempts to move forward. Each such extinction will activate the pulse reversal generator 23 to return the spot to the opposite side of the area which it is attempting to leave. The spot thus jitters back and forth as shown in FIGURE 4, in a limited area, until an overflow on the X-axis activates the Y Advance Gate 24 through wire 25, permitting the Y spot to advance one position and the Y-axis coordinate counter 26 to advance one binary position. The corresponding deflection plates in the raster tube 2 are connected electrically in parallel by wires 11 and 12 with those of the Y-axis controlling tube 6, through a filter network 27, to remove objectionable jitter in the raster itself while permitting similar deflection.

Upon total coincidence of the X and Y-axis coordinate counters with the required input, the beam of the raster tube is turned on momentarily by the coincidence control 28 to produce the photographic exposure; and a new input number is read into the Read-in Buffer 29 from the Read-in device 30.

Simultaneous overflow of both X and Y-axis coordinate counters 22 and 26 will cause the film advance mechanism 31 to bring into position a fresh frame of film, and reset and restart the entire cycle of operation.

Having described separately certain portions of this invention, referring to FIGURE 2, one complete operating cycle will now be described to show the relationships of each part or function to the whole of the invention.

For the purposes of this description, the operating cycle will be considered to begin at that point in time when the film advance mechanism 31 has been activated by the manual advance 38 to move into position a fresh portion of unexposed photographic film 4. During advancement of film 4 an interlock contact, not shown, will place a potential on wires 39 leading to overflow reset circuits 40 and 41, to continuously energize said circuits until the film is in position for exposure, at which time the holding circuits 39 will be de-energized.

Activation of overflow reset 40 or 41 will cause a potential to be placed upon wires 42 or 43 respectively. However, the film advance 31 will not be activated except when both wires 42 and 43 are activated simultaneously, as at the end of a cycle.

Activation of overflow reset 40 by wires 39 or 44 resets the X coordinate step counter 22 to zero through path 46 and returns the X sweep generator 49 through path 48 to its starting position, while blanking out the electron beam in tube 5.

Activation of overflow reset 41 by wires 39 or 45 resets the Y coordinate step counter 26 to zero through path 47, and returns the Y sweep generator 50 through path 51 to its starting position, while blanking out the electron beam in tube 6.

After being reset, X sweep generator 49 will begin sweeping the electron beam across the face of tube 5 at a steady rate. The image of this beam, as focused upon optical commutator 15 by lens 16, will be intermittently cut off from reaching photocell 13 through lens 14. Each time light passes through the pattern 15 to photocell 13, a pulse will be emitted by the amplifier 21 through wire 52, to cause the X coordinate step counter 22 to advance by one binary step. The overflow detector which forms a part of counter 22 will emit a pulse through wire 44 to the overflow reset 40 when the count reaches the desired highest number, thereby restarting this portion of the cycle. Overflow reset 40 also emits a pulse over wire 25 to momentarily activate the Y advance gate 24, permitting the next pulse from black-out detector 53 over wires 54 and 55 to reach the Y coordinate step counter 26, and advance said counter by one binary step.

In the absence of a pulse on wire 25, the pulses from black-out detector 53 are directed by way of wire 56 to the reversal pulse generator 23 which, through path 57, restores the Y sweep beam to the opposite side of that opening which it is attempting to leave.

From the foregoing descriptions, it will be clear that the combination of binary counts held in the X and Y coordinate counters will represent step by step, in serial manner, the position of the beam spot of the rastor tube 2 at any time that its Z axis control grid is turned on.

Any one of numerous well known read-in devices, such as punched card readers, paper tape readers, magnetic tape readers or certain well known forms of computer output buffers may be used as the input 30. It is to be understood that said read-in device 30 includes the necessary means for translating from the input device machine language to the binary coding system used by the X and Y coordinate step counters 22 and 26, in order to simplify comparison of the contents of said counters with the desired coordinate location being called for by the read-in device 30. The read-in buffer 29 shown connected by wire 32 may, in fact, be a part of the read-in device 30 or of the translating means above mentioned, but in any event serves as a temporary memory for the desired input coordinates, and provides a pattern of electrical potentials through the path 33 to be compared (by the coincidence control 28) with the patterns of a electrical potentials developed in the coordinate step counters 22 and 26 connected through paths 34 and 35 respectively. Upon the coincidence of the combined patterns from the X and Y coordinate counters 22 and 26 with the pattern stored in the read-in buffer 29, a potential will be applied to the wire 37 connected with the Z axis control grid of the raster tube 2, to produce a momentary spot of light on the face of said tube. The spot of light will be defined by grid 1 and focused by lens 3 upon an unexposed portion of the photographic film 4, to produce a dot thereon when developed.

At the same time, a control pulse will be transmitted over wire 36 to the read-in device 30, to cause the reading in of a new set of desired coordinates and a repetition of the above described portion of the cycle of operation.

At the time that overflow occurs in both axes, the film advance is activated by wires 42 and 43 and a new cycle is begun.

To provide sufficient time for the read-in device 30 to load the read-in buffer 29 without missing a comparison step, it may be necessary to provide an electronic gate, not shown, in wire 25 to prevent activation of the Y advance gate 24 during read-in operations. This would have the effect of causing the X sweep generator 49, and the X coordinate step counter 22, to repeat one or more cycles without affecting the Y sweep generator 50 or the Y coordinate step counter 26 during the read-in delay.

Figure 5:
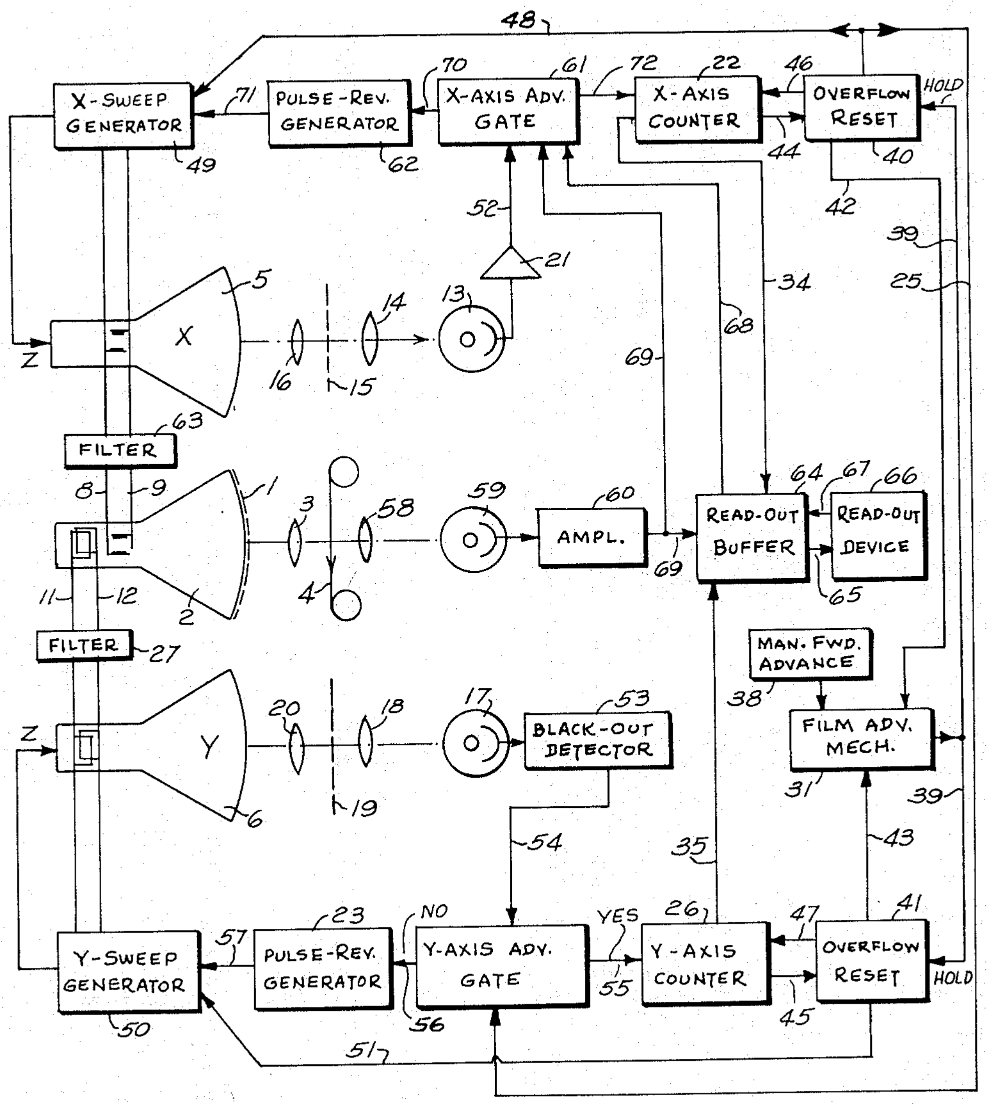
FIGURE 5 shows a modification of this invention to permit reading out the location of light transparent areas in a finished film or stack of superimposed films.

Referring now to FIGURE 5 it will be seen that substituting one or more strips of developed film or term cards 4 for the unexposed film 4 of FIGURE 2, and placing behind these another lens 58 and a photocell 59 and amplifier 60 to detect the passage of light through said film or films, we may utilize the basic principles of this invention to read out the coordinates of information bearing transparent spots.

The basic circuitry for the Y axis remains as it was in FIGURE 2, but we must now provide a similar means for halting the advance of the X axis during any necessary read out interval. The output of amplifier 60 is made to control gate 61 through wire 69 so that the impulse from amplifier 21 may pass through to step counter 22 only if no light reaches photocell 59. Otherwise, the output from amplifier 21 is caused to activate the pulse reversal generator 62 to cause the X-axis beam in cathode ray tube 5 to jitter back and forth, in the manner previously explained with respect to cancelling the forward motion of the Y-axis. At the same time readout buffer 64 feeds signal 68 to lock gate 61 until read out has been completed. Filter 63 serves to minimize jitter in the raster tube 1 in the same manner as filter 27 does on the Y-axis.

The readout buffer 64 passes the combination of X and Y-axis coordinate data 65 to the read out device 66 which in turn feeds back signal 67 when ready for further read out. Signal wire 68 then releases gate 61 so that the X-axis cathode ray tube 5 beam may advance.

The scope of the invention is not limited to the embodiments shown but includes all embodiments and modifications comprised in the claims.

I claim:

1. Apparatus for selectively exposing to light a selected small spot of a photographic film, the position of said selected small spot being defined by a pair of numerical position coordinates representing the position of the spot in a coordinate array, comprising:

(*a*) a first cathode ray tube having a display screen, an intensity control and a pair of orthogonal scan beam deflection controls, (*b*) means for imaging the screen of said first cathode ray tube upon the photographic film, (*c*) second and third cathode ray tubes each having a display screen and a linear-scan beam deflection control, (*d*) the beam deflection controls of said second and third tubes being electrically connected to the respective beam deflection controls of said first tube, (*e*) a linear ladder-array mask associated with the screen of each of said second and third tubes and oriented parallel to their respective linear scan directions, (*f*) individual photocells positioned to receive light transmitted from said respective second and third tubes through their respective linear masks, (*g*) individual sweep control signal generators connected to the respecttive beam deflection controls of said second and third tubes, (*h*) counter circuits controlled by said photocells and connected to register the instantaneous linear position coordinates of the beams of said second and third tubes and thereby the instantaneous rectangular position coordinate control signals applied to the beam deflection controls of said first tube, (*i*) a read-in device for registering the position-coordinates of a spot on said film desired to be exposed to light from said first tube, (*j*) means for continuously comparing the registration in said read-in device with the registrations of said counter circuits to produce a control signal when the signals applied to the beam deflection controls of said first tube are in agreement with the registration in said read-in device, and (*k*) means responsive to the control signal from said comparing means for energizing the intensity control of said first tube to expose the spot of said film corresponding to the registrations in said read-in device.

2. Apparatus in accordance with claim 1, including (*l*) overflow signalling circuits in said respective counter circuits, responsive to completion of a predetermined maximum count in each of said counter circuits, and (*m*) means controlled by said overflow signalling circuits for triggering said respective sweep generators.

3. Apparatus in accordance with claim 2, including (*n*) means controlled by said overflow signalling circuits for resetting said respective circuits to zero count registrations.

4. Apparatus in accordance with claim 2, in which said film is a strip film movable to expose successive frames thereof to said imaging means, and (*o*) means controlled by one of said overflow signalling circuits for advancing said film.

5. Apparatus in accordance with claim 2, including (*p*) a sweep jitter pulse source controlled by one of said photocells and connected to the corresponding one of said sweep generators to subtractively modulate its sweep output, and (*q*) gate means controlled by one of said overflow signalling circuits for selectively inhibiting said jitter pulse source.

6. Apparatus in accordance with claim 5, including (*r*) jitter-suppressing filter means in the connection between the beam deflection control of said first tube and the beam deflection control of that other tube whose sweep generator is connected to said sweep jitter pulse source.

References Cited in the file of this patent

UNITED STATES PATENTS

| | | |
|---|---|---|
| 2,142,541 | Vogel | Jan. 3, 1939 |
| 2,596,741 | Tyler et al. | May 13, 1952 |
| 2,624,798 | Dinga | Jan. 6, 1953 |
| 2,721,900 | Oliver | Oct. 25, 1955 |
| 2,898,176 | McNaney | Aug. 4, 1959 |
| 2,994,077 | Terhune | July 25, 1961 |